US010643471B2

(12) United States Patent
Hohenacker (10) Patent No.: US 10,643,471 B2
(45) Date of Patent: May 5, 2020

(54) METHOD FOR DETECTING PARKED VEHICLES

(71) Applicant: Cleverciti Systems GMBH, Munich (DE)

(72) Inventor: Thomas Hohenacker, Starnberg (DE)

(73) Assignee: CLEVERCITI SYSTEMS GMBH, Munich (DE)

( * ) Notice: Subject to any disclaimer, the term of this patent is extended or adjusted under 35 U.S.C. 154(b) by 0 days.

(21) Appl. No.: 16/091,283

(22) PCT Filed: Mar. 30, 2017

(86) PCT No.: PCT/EP2017/057500
§ 371 (c)(1),
(2) Date: Oct. 4, 2018

(87) PCT Pub. No.: WO2017/174427
PCT Pub. Date: Oct. 12, 2017

(65) Prior Publication Data
US 2019/0156673 A1 May 23, 2019

(30) Foreign Application Priority Data
Apr. 8, 2016 (DE) .......................... 10 2016 106 513

(51) Int. Cl.
*G08G 1/14* (2006.01)
*G07B 15/02* (2011.01)
(Continued)

(52) U.S. Cl.
CPC ......... *G08G 1/142* (2013.01); *G06Q 10/0833* (2013.01); *G06Q 20/10* (2013.01);
(Continued)

(58) Field of Classification Search
None
See application file for complete search history.

(56) References Cited

U.S. PATENT DOCUMENTS

2004/0252034 A1* 12/2004 Slemmer .................. G08G 1/14
340/932.2
2006/0187043 A1 8/2006 Allen
(Continued)

FOREIGN PATENT DOCUMENTS

DE 102007034170 A1 1/2009
WO 2015004325 A1 1/2015

*Primary Examiner* — Thomas S McCormack (57) ABSTRACT

A method for detecting parked vehicles, wherein parking regions in a parking area are identified and/or defined, a transponder is arranged in or on a vehicle, the transponder automatically repeatedly transmits an identification signal, the identification signal is received by at least one radio device, a position of the vehicle is calculated and an identification of the transponder is determined by means of a control device on the basis of the identification signal, it is determined whether the vehicle is one of the parking regions, it is determined on the basis of the identification signal whether the vehicle is parked, provided that the vehicle is parked in one of the parking regions, the identification of the transponder and the parking region used by the vehicle are transferred to a registration server, and the registration server outputs a status signal for the parking region used on the basis of the identification of the transponder.

19 Claims, 1 Drawing Sheet

(51) Int. Cl.
*G06Q 50/30* (2012.01)
*G06Q 10/08* (2012.01)
*G06Q 20/10* (2012.01)

(52) U.S. Cl.
CPC ............ *G06Q 50/30* (2013.01); *G07B 15/02* (2013.01); *G08G 1/146* (2013.01); *G08G 1/149* (2013.01)

(56) References Cited

U.S. PATENT DOCUMENTS

| | | | |
|---|---|---|---|
| 2008/0258934 A1 | 10/2008 | Chemali | |
| 2012/0056758 A1* | 3/2012 | Kuhlman | G08G 1/14 340/932.2 |
| 2012/0236149 A1* | 9/2012 | Nagy | E04H 6/426 348/148 |
| 2014/0036076 A1* | 2/2014 | Nerayoff | H04N 7/181 348/148 |
| 2014/0335897 A1 | 11/2014 | Clem | |
| 2015/0178640 A1* | 6/2015 | Balakrishnan | G06Q 50/30 705/13 |
| 2015/0221140 A1* | 8/2015 | Eid | G07B 15/063 705/13 |
| 2015/0356498 A1* | 12/2015 | Casanova | G06Q 10/087 705/13 |
| 2016/0140846 A1* | 5/2016 | Outwater | G08G 1/144 340/932.2 |

\* cited by examiner

METHOD FOR DETECTING PARKED VEHICLES

CROSS-REFERENCE TO RELATED APPLICATIONS

This application is a national stage entry under 35 U.S.C. 371 of PCT application no. PCT/EP2017/057500 filed on Apr. 8, 2016. The entire disclosure of the above application is hereby incorporated by reference.

BACKGROUND

The present invention relates to a method of detecting parked vehicles.

Finding a free parking space (i.e. a free parking bay) can be laborious and time consuming in large parking space zones, in particular in large corporate car parks having several hundred or even several thousand parking spaces, due to the large area over which such parking spaces extend.

There is therefore an interest in knowing the occupation status of parking bays and of communicating it to users of the parking space zones where possible.

In addition, parking bays within the parking space zone may be reserved for specific user groups. Such user groups can, for example, be persons with a disability, older persons, drives of electric cars or—in the case of corporate car parks—members of management. Checking whether only authorized persons have parked in the parking bays assigned them can require the constant use of parking attendants, whereby the monitoring of parking authorizations can likewise be laborious and expensive.

SUMMARY

It is the object underlying the invention to provide a method of detecting parked vehicles that minimizes the effort for detecting the parked vehicles.

This object is satisfied in accordance with the invention by a method in accordance with claim 1.

In accordance with the method of the invention parking bays in a parking space zone are recognized and/or determined; a transponder is arranged in or at a vehicle; the transponder automatically repeatedly transmits a recognition signal; the recognition signal is received by at least one radio device; a position of the vehicle is calculated and an identification of the transponder is determined by means of a control device with reference to the recognition signal; a determination is made whether the vehicle is in one of the parking bays; a determination is made with reference to the recognition signal as to whether the vehicle has parked; and if the vehicle has parked in one of the parking bays, the identification of the transponder and the parking bay used by the vehicle are transmitted to a registration server, with the registration server outputting a status signal for the parking bay used with reference to the identification of the transponder.

In accordance with the invention, a transponder is provided in a vehicle whose position is determined by means of the recognition signal. A recognition signal can here also be understood as a plurality of signals that are spaced apart in time and that are, for example, periodically transmitted by the transponder.

Once it has been determined that the vehicle in or at which the transponder is arranged has parked in one of the parking bays, the identification of the transponder is transmitted to a registration server, whereupon the registration server outputs a status signal for the parking bay used.

The invention makes use of the recognition that the provision of a transponder in or at a vehicle enables both the localization and the identification of the vehicle. The method in accordance with the invention therefore allows a parking space occupation to be determined completely automatically on the basis of the fully automatic localization and identification of the transponder.

The vehicles can, for example, be passenger cars, trucks, motorcycles, bicycles, trailers and the like. It is likewise possible that the vehicles are ships or aircraft. In this case, the parking bays can be mooring stations of a port or park positions at an airport.

The individual steps of the method will be explained more exactly in the following.

The parking bays within the parking space zone can be fixed at one time, for example. Alternatively, the parking bays can also be recognized with reference to the position of vehicles or their transponders. In addition, areas can also be fixed or determined in which parking is generally unwanted or prohibited (prohibited zones). Such areas can, e.g., be a street or a fire engine access zone.

A parking space zone here designates a surface area in which a plurality of parking bays are located. A parking bay can also be called a single parking space, that is one parking bay typically provides space for one vehicle. The parking bays can have different sizes and can thus, for example, be adapted to the size of passenger cars, trucks or bicycles.

The transponder arranged in or at the vehicle can, for example, be taken along in the glove compartment or behind the windshield and can comprise a battery respectively a rechargeable battery for the power supply. The transponder can also be attached to an outer surface of the vehicle or can be fixedly installed in a vehicle and can, for example, be arranged in a rear view mirror of the vehicle. The transponder can in this case be coupled to the electric onboard network of the vehicle. The transponder can, for instance, have the size of a cigarette pack, of a matchbox, or of a credit card and can transmit the recognition signal automatically. The automatic transmission can here take place in unchanging time intervals without any influence from the outside. Alternatively, the transponder can automatically transmit the recognition signal as a reply to a query signal that arrives from outside and that is e.g. transmitted by the radio device. The recognition signal and the query signal can be radio signals.

The recognition signal is received by the radio device (also called an armature). The radio device can, for example, comprise a swivelable directional antenna to determine the position of the transponder. The radio device can be attached in a fixed position, for example at an elevated position, at or in an illumination device of the parking space zone. Alternatively, the radio device can also be mobile and can e.g. be attached to a parking monitoring vehicle. The position of the transponder or the position of the vehicle associated with the transponder can be determined from a direction of incidence of the recognition signal together with a position of the radio device.

It is likewise possible to use at least three radio devices spaced apart from one another in a spatially fixed manner. In this case, the recognition signal is received by the three radio devices, with the absolute or relative position of the vehicle (i.e. the position of the transponder) being able to be determined by means of triangulation on the basis of time of flight differences with respect to the individual radio devices. The relative positions of the radio devices toward one another can be known here. Alternatively, the absolute positions, such as the GPS coordinates, can also be known to the radio devices. Instead of three radio devices, 4, 5, or 6 radio devices can in particular also be used, whereby the accuracy of the localization can be increased.

In large parking space zones, a plurality of radio devices can be uniformly distributed over the parking space zone to enable the localization of vehicles in the total parking space zone.

An identification code of the transponder can be included in the recognition signal and, for example, indicates a unique serial number of the transponder. The control device can determine the identification of the transponder with reference to the identification code.

Once the position of the vehicle is known, a determination can be made by a comparison with the known parking bays whether the vehicle is in one of the parking bays, i.e. is in one of the parking bays or is parked in a prohibited zone, for example.

Whether the vehicle is parked can furthermore be determined with reference to the recognition signal. This can be done, for example, such that the position of the vehicle is calculated multiple times with reference to a plurality of sequential recognition signals, with it being assumed that the vehicle is parked on a position remaining the same over a predefined time period.

If it has been determined that the vehicle is parked in one of the parking bays, the identification of the transponder and the parking bay used by the vehicle are transmitted to the registration server, with the registration server outputting a status signal for the respective parking bay with reference to the identification of the transponder. It can be included in the status signal whether the respective parking bay is occupied and/or by which kind of vehicle and/or by which use the respective parking bay is occupied. The registration server can also output a respective status signal for a plurality or for all of the parking bays of the parking space zone. Alternatively, the occupation of a plurality or of all the parking bays of the parking space zone can be included in a single status signal. The status signal can e.g. be output in the form of a digital data signal.

The method in accordance with the invention can in particular be carried out repeatedly, with the method, for example, being repeated for each new vehicle entering the parking space zone. Recognition signals are preferably transmitted/or requested almost constantly (e.g. several times a second) so that the change of position of a vehicle can be tracked. A plurality of transponders (and thus a plurality of vehicles) can also be localized simultaneously, whereby large parking space zones can also be monitored.

Advantageous further developments of the invention can be seen from the description, from the drawing and from the dependent claims.

In accordance with a first advantageous embodiment, the registration server determines an authorization status for the parking bay used with reference to the identification of the transponder, with the authorization status being included in the status signal.

The registration server can generally determine an authorization status. This means that the registration server checks whether an authorization to park in the respectively used parking bay is associated with the identification of the transponder or not. For this purpose, a look-up table can be present in the registration server in which the respective authorizations are entered for each transponder (and thus for the corresponding user and/or for the corresponding vehicle). For example, the authorization to park in parking bays that are reserved for electric cars can be entered in the look-up table for a transponder that is associated with an electric car.

Accordingly a required authorization to park can be fixed for parking bays of the parking space zone. It can, for example, be indicated that predefined parking bays may only be used by electric cars and/or only by members of management of a company. The authorizations can likewise be stored in a look-up table in the registration server. In addition, the authorizations can be noted on an outer side of the transponder, for example in the form of a printed card that shows the parking bays for which there is a parking authorization. Alternatively, the authorization can also be indicated by a display of the transponder. A user can recognize at the transponder in this manner where parking bays provided for him are present.

The status signal can e.g. comprise a parking bay for electric cars being occupied by an electric car, i.e. the parking bay is used by a vehicle having the correct authorization. A positive authorization status can be present in this case. The status signal can additionally include the time (time of day/date) since which the parking bay has been used and which specific vehicle is using the parking bay. The status signal can therefore indicate an occupation status of the respective parking bay and can indicate, if the parking bay is occupied, whether the parked vehicle has a corresponding authorization.

The automatic authorization determination here ensures that vehicles parking without authorization can be recognized with little effort. In this manner, parking attendants can be saved in some cases, which can result in a reduction in costs.

If there is no authorization, for example if a "normal" user has parked in a parking space for electric cars, the status signal can indicate that a negative authorization status is present. Parking attendant staff can e.g. be informed in such a case. Alternatively, an indication signal associated with the parking bay can e.g. be activated; for example a flashing light can indicate that the respective vehicle has parked without authorization.

The detection of occupied parking spaces and the determination of the authorization status are thus greatly simplified. No interaction of the driver is preferably required for this. Expensive floor sensors for vehicle recognition can in particular be saved by the method in accordance with the invention. The often substantial investment and maintenance costs for such floor sensors can then be dispensed with.

In accordance with a further advantageous embodiment, status signals relating to a plurality of parking bays are transmitted to a car park server and/or to a mobile display unit. The parking space server and/or the mobile display unit can display an overview of free and occupied parking bays with reference to the status signals. The mobile display unit can in particular be a cellular telephone that indicates the free and occupied parking bays by means of an app. The parking space server can present the free and occupied parking bays by means of a website. The parking space server and/or the mobile display device can access the registration server to poll information on occupied and free parking bays.

The mobile display unit can, for example, be used to guide a driver to a free parking bay in a large corporate car park or also in a public car park (e.g. a customer car park). For this purpose, which authorizations the driver or the vehicle has can be communicated to the mobile display unit. The mobile display unit can thus direct a member of management to a free parking bay reserved for management.

A similar application scenario can e.g. be used on park and ride parking lots. The transponders can here be issued by a railroad company, with train passengers being able to be informed of where free parking bays are present by means of the mobile display unit.

In accordance with a further advantageous embodiment, a transponder is issued to vehicles without transponders at an entrance to the parking space zone. For example, an automatic issuing station for transponders can be provided at the entrance that issues the transponder in a similar manner to a parking ticket. Guests in a corporate car park can in this manner e.g. be identified as such by the issued transponder. The issued transponders can be returned to an automatic return station on the departure from the parking space zone.

The length of stay of guests in the corporate car park can e.g. be monitored in this manner. It is correspondingly also possible to detect the length of the stay and thus also the presence of employees.

It is additionally possible on the basis of the detection of the length of stay also to carry out the billing of parking charges by means of the transponder. For example, the automatic return station for the transponder can demand the parking charges incurred. In this manner, the transponder can be used both to detect the parked position and to pay for the parking process.

The method can also be used to monitor taxi stands. It is a requirement here that all the taxis have a respective transponder. If respective radio devices are attached to different taxi stands, a determination can be made as to how many taxis are parked at a respective taxi stand. Other taxi drivers can then e.g. check by means of the mobile display unit where free parking bays are still present at taxi stands.

A further possibility of use is the tracking of vehicles in vehicle production. Vehicles are frequently parked in large numbers in parking lots in this process. If each of these vehicles is equipped with a transponder, the vehicles parked at any one of the parking bays can be visualized, for example on a website of the car park server. To associate the produced vehicles with the respective transponder, a barcode or an RFID chip of the vehicle can be scanned in an automated process and can be associated with the respective transponder of the vehicle. A localization of specific vehicles, e.g. for shipping, can then take place by means of the mobile display unit that can visualize the position of the vehicle.

Further preferably, an entrance restriction of the parking space zone, for example by means of a barrier, can only be removed when it is recognized that the vehicle has a transponder and in particular has an authorization to park in at least one parking bay of the parking space zone. A check can additionally be made whether at least one of the parking bays is free for which the vehicle has an authorization. The entrance restriction can also be removed when a transponder had been issued by means of the automatic issuing station.

In accordance with a further advantageous embodiment, a parking charge for the respective parking bay used can be calculated with reference to the identification of the transponder and/or with reference to the parking bay used and further with reference to a rate. The registration server can in particular initiate a payment process when a parking charge is incurred.

This means that the registration server can check which amount of money is due to the parking on a specific parking bay and thereupon initiates a payment process as necessary. The payment process is, for example, not initiated when the parking on the parking bay is free at that time.

The payment process can be a debiting of an account, of a credit card, of a PayPal account or the automatic issuing and mailing of an invoice. Alternatively, the registration service can also access a database in which paid-in credit is stored and can reduce the credit for the respective transponder or for the respective vehicle owner by the determined parking charge.

The payment process is advantageously only initiated when the vehicle has left the parking bay again, i.e. the parking process has ended. The payable parking charge can then be determined with reference to the length of the parking process. A determination can be made for this purpose whether the vehicle has departed the parking bay, with a length of the parking process being able to be transmitted to the registration server.

Such an automatic accounting of parking charges ensures here that the parking charges for a parking process are paid, whereby losses of takings due to parking charges being spuriously not paid can be avoided. In addition, parking attendants can be saved, which can result in a reduction in costs. The payment process for the parking charges can be greatly simplified in this manner and does not require any interaction of the driver.

In accordance with a further advantageous embodiment, a stopping of the vehicle that lasts longer than a predefined length of time is registered as a parking of the vehicle. This means that a stopping of longer than, for example, two minutes or five minutes can be defined as parking. It can hereby be precluded that e.g. a vehicle in a traffic holdup that moves sporadically is considered a parked vehicle. The authorization can in particular only be checked when the vehicle has been registered as parked.

In accordance with a further advantageous embodiment, a vehicle owner and/or a vehicle registration is associated with the identification of the transponder by the registration server and the authorization status is determined with reference to personal data of the vehicle owner and/or of the vehicle registration. It is likewise possible that a rate is determined with reference to personal data of the vehicle owner and/or of the vehicle registration. This means that personal data of the vehicle owner and/or of the vehicle registration can be stored in the registration server, with a respective transponder being associated with a respective vehicle owner and/or with a respective vehicle registration. The respective authorization status and/or rate for different vehicle owners can differ on the basis of the personal data; for example, residents, train ticket holders, persons with disabilities, flat-rate subscribers, etc. can have access to special parking bays. An emission class of the respective vehicle can furthermore also be linked to the identification of the transponder, whereby more parking bays can be provided for vehicles with low emissions.

By the possibility of, for example, already knowing the occupation status of a parking space before arrival, the use of park and ride parking lots can e.g. be promoted if the carrying of a transponder is compulsory for these park and ride parking lots.

The authorization status and/or the rate is preferably also determined with reference to the time, to the day of the week and/or to the location of the parking bay used. The possibility is hereby provided of, for example, issuing different authorizations or demanding higher parking charges at peak times, whereas parking can be allowed free and for everyone e.g. at night or on Sundays.

In accordance with a further advantageous embodiment, a credit is associated with the identification of the transponder that is reduced by the parking charge in the payment process. Prepaid models are thus also possible, for example, with the credit corresponding to a previously paid in amount of money. An address of the vehicle owner can also be associated with the credit. The vehicle owner can, however, alternatively also remain anonymous.

The transponder can preferably be sold for a small amount of e.g. €10, with the paid amount of money already being able to be registered as a credit. Once the credit has been used, the driver can top up the credit—in a similar manner to a prepaid card of a cell phone—by buying new credit.

In accordance with a further advantageous embodiment, the transponder transmits the recognition signal in encrypted form, with the recognition signal in particular being generated by means of an asymmetrical method. It can hereby be suppressed that the recognition signal of the transponder is intercepted, coped and transmitted repeatedly by a third party to imitate the original transponder. It is made more difficult in this manner that the identity of the transponder is stolen.

The recognition signal can preferably have a variable portion, for example a time stamp, a random number, or a part of the query signal, with the variable portion likewise being encrypted. The imitation of the recognition signal can hereby be made yet more difficult.

The transponder is further preferably configured to recognize a movement of the vehicle, wherein a frequency of occurrence of the transmission of recognition signals after a predefined time period without a movement of the vehicle is reduced or a transmission of the recognition signal is fully suppressed. This means that a frequency of occurrence of the transmission of recognition signals can be designed as variable, in particular in dependence on movements of the vehicle. It can hereby be achieved that the transponder of a stationary or parked vehicle does not unnecessarily transmit a large number of recognition signals. Energy can be saved in the transponder in this manner. In addition, the radio device is not confronted with too many recognition signals so that the individual recognition signals can be localized better. For example, the frequency of occurrence of the recognition signals can be reduced 5 or 10 minutes after the last recognized movement of the vehicle. To recognize movements of the vehicle, the transponder can comprise a GPS system, can access a GPS system and/or can comprise an acceleration sensor and/or a gyroscope. If the vehicle leaves its parked position, this change of status can e.g. be recognized by means of the acceleration sensor, whereupon the frequency of occurrence of the transmission of recognition signals can be increased again.

In accordance with a further advantageous embodiment, the transponder indicates a status, in particular by means of a light signal. The light signal can, for example, indicate whether an authorization to park in the respective parking bay is present, whether a parking charge has been paid and/or whether a maximum parking time has been exceeded. The transponder can comprise an RGB LED (red/green/blue LED) for this purpose and can be informed of the status by the radio device. This means that the radio device can advise the transponder whether an authorization to park is present or whether a parking charge has been paid. The transponder can, for example, be arranged behind the windshield and can light up green if an authorization to park is present and the parking charges have been paid. A red light can indicate that there is no authorization to park.

It is preferred if an indication signal is output if a vehicle has parked outside the parking bays. The indication signal can, for example, be output when a double parking has been recognized or a parking in a fire department access zone or the like has been recognized. The indication signal can be output by the control device or by the registration server and can, for example, advise a municipal office or the police of the unwanted parking procedure.

In accordance with a further advantageous embodiment, an evaluation of the occupied and free parking bays is carried out and data on the free parking bays are supplied to a car park routing system. If the carrying of a transponder in or at a vehicle is compulsory, a distinction between free and occupied parking bays can be made with reference to the transponder. The number of free parking bays can then be supplied to a car park routing system, whereby motorists looking for a parking space can be routed fast and effectively to free parking bays. Alternatively or additionally, the free parking bays can also be stored, as described above, in a database of the car park server which can be accessed by means of a web interface or an application of a smartphone (i.e. of the mobile display unit).

The evaluation of the occupied and free parking bays can also comprise a statistical evaluation with reference to which predictions can be made on parking bays that will become free in the future (for example, with reference to queuing theory). Drivers who are still far away from their destination can hereby be routed such that they find a free parking bay with a high probability on their arrival.

The parking space zone is particularly preferably additionally detected at least regionally by means of a monitoring system, preferably optically, by means of ultrasound, by means of radar and/or by means of floor sensors, with free and occupied parking bays being recognized by means of a recognition unit, in particular by means of image processing, preferably with reference to single frames. The monitoring system can comprise a camera system having one or more cameras that detect the parking space zone, whereby the use of imaging processing algorithms can be made possible. Alternatively or additionally, the monitoring system can also comprise ultrasound sensors, radar sensors and/or floor sensors. The additional use of a monitoring system is in particular sensible when a transponder is not present in every vehicle. The monitoring system then provides the possibility of recognizing free and occupied parking bays independently of present transponders. The authorization status of vehicles without transponders can here generally be set as negative. In addition, the possibility results, for example, of verifying a parking process recognized with reference to the recognition signal optically by means of the monitoring system.

A check is therefore in particular made with reference to the monitoring system whether a vehicle identified as parking by means of the recognition signal has actually parked in the determined parking bay, with the identification of the transponder and the parking bay used by the vehicle only being transmitted to the registration server in the case of a correct determination of the parking process.

The monitoring system can be configured to determine whether a vehicle is parked in a specific parking bay. The vehicle per se or a license tag of the vehicle can, however, e.g. not be recognized with reference to the monitoring system.

In accordance with a further advantageous embodiment, a message signal is output if a vehicle is detected in a parking bay by the monitoring system, with the position or presence of the vehicle not having been determined by means of a recognition signal. The message signal can serve to report vehicles without transponders or with defective transponders so that parking attendants can directly check the payment of the parking charges for this vehicle (e.g. by means of a conventional parking ticket).

The invention further relates to a system comprising at least one transponder, at least one radio device, a control device, and a registration server that is connected to the control device by means of a data link. The system in accordance with the invention is characterized in that it is configured to carry out the above-described method.

In accordance with an advantageous further development, the radio devices are attached in or to streetlamps, to building fronts, to road signs, in the monitoring system and/or to traffic lights. This means that the radio devices can be arranged in an elevated position above the ground, whereby a good reception of the recognition signals results.

The radio devices can make use of the power supply of the streetlamp or of the traffic lights. The installation effort for the radio devices can hereby be reduced.

Alternatively, the radio devices or the total system can be supplied with electric energy from solar cells. The radio devices can each comprise a solar cell for this purpose. The use of solar cells can enable the use of the system in poorly developed areas. e.g. in rural regions. In addition, solar cells reduce the effort for installing the system since, for example, every radio device does not have to be separately connected to a power network. Park and Ride parking lots are often present in said rural regions that can be monitored without any great investments by the use of solar cells. To establish a data link to the registration server, a cellular radio connection can be used as the data link. The system can preferably be switched off at night when solar cells are used since Park and Ride parking lots are typically only used a lot during the day.

The transponder preferably comprises a solar cell that supplies the transponder with energy, with the transponder being configured for fastening to a windshield of a vehicle. The solar cell can permit the transponder to be operated over time periods without limit in principle without a battery having to be changed, for example. In this manner, the payment of parking charges for a user is further simplified since the transponder only has to be fastened in the vehicle once, e.g. behind the windshield, with no further maintenance measures subsequently being necessary at the transponder. The transponder can, for example, comprise an adhesive surface by which the transponder can be fastened to the windshield.

The transponder and the radio device are preferably configured for a radio communication in the frequency range of approximately 2.4 GHz, with a frequency range of 2.2 GHz up to 2.6 GHz, for example, being able to be used. The transponder and the radio device in particular use wireless LAN, Bluetooth and/or ZigBee. The ISM band is preferably used that is in the range of 2.4 GHz.

In accordance with an embodiment, the transponder and the mobile display unit are the same unit and are in particular a cell phone (smartphone). The hardware of the cell phone can here be used both to transmit the recognition signals (e.g. by means of wireless LAN or Bluetooth) and to visualize the free and occupied parking bays. The mentioned app on the cell phone can in particular initiate the transmission of the recognition signals.

The recognition signals can be so-called "chirp" pulses having a changing frequency, with the transmission frequency being changed from a start frequency up to an end frequency during a pulse. The frequency change provides the possibility of also reliably detecting the recognition signal with broadband background radiation.

In accordance with a further advantageous embodiment of the system in accordance with the invention, a mobile unit is provided that is configured to receive recognition signals of the transponder, to transmit an identification of the transponder to the registration server, and to receive information from the registration server on a vehicle associated with the transponder. The mobile unit can, for example, be carried by parking attendants or can be installed in a parking monitoring vehicle. The identification of the transponder can be determined for a respective vehicle by the mobile unit, with information on the vehicle associated with the respective transponder being able to be received from the registration server by the mobile unit by means of a return channel. The mobile unit hereby permits a check to be made whether a transponder is also present in the vehicle associated with it so that a passing on of transponders or a multiple use of transponders in different vehicles can be suppressed or be associated with sanctions.

A monitoring system is particularly preferably provided for the optical, at least regional, detection of the parking space zone, with the monitoring system comprising a camera system and a recognition unit that is configured to recognize free and occupied parking bays, in particular by means of image processing, preferably using individual frames. In addition to the recognition of parked vehicles by means of the transponder and its recognition signals, an additional check of the parking situation can take place—as explained above—by means of the monitoring system. The monitoring system will be described in more detail in the following.

The recognition unit of the monitoring system preferably also comprises the control device. Only one signal processor can hereby be present in the system in accordance with the invention that evaluates both the recognition signals and the data provided by the monitoring system. The costs of the system can hereby be reduced.

The recognition unit or the monitoring system can also serve as a bridge (i.e. as a gateway) and can establish an internet connection and/or a data link between the control device and the registration server. An internet connection of the monitoring system that may anyway be present can then be used better.

Possible embodiments of the monitoring system will be explained in more detail in the following.

The monitoring system preferably comprises at least a street lighting device, a camera system installed at or in the street lighting device, a recognition unit, a transmission unit, and preferably a mobile display unit, with the camera system being configured to deliver image indications of parking bays within the parking space zone and with the recognition unit in particular being configured to store the geographical coordinates of parking bays located in the visual range of the camera system;

to associate a respective occupation status to the parking bays in dependence on the image indications that marks whether a respective parking bay is free or occupied; and to provide the respective occupation status of at least the free parking space areas with the associated geographical coordinates to a transmission unit, wherein the transmission unit is preferably configured to transmit the respective occupation status of at least the free parking bays with the associated geographical coordinates to the mobile display unit.

Alternatively, the transmission unit can also transmit the respective occupation status of at least the free parking bays with the associated geographical coordinates to the registration server and/or to the car park server. The registration server can then verify whether all the vehicles recognized as parked also carry a transponder.

The monitoring system can comprise at least one of the radio device and can thus contribute to the localization of the transponder. In addition, the occupation status can be compared with the data that are present on the basis of the position determination by means of the transponder, whereby parking processes can be verified.

The monitoring system can monitor the parking space zone optically by means of the camera system, with free parking bays within the parking space zone monitored by the camera system being able to be determined and displayed dynamically. To implement the monitoring system, at least one camera system, at least one recognition unit, at least one transmission unit, and/or at least one display unit can act together. The display unit can be that mobile display unit that communicates with the registration server to display a utilized capacity of the parking bays determined by means of the transponders. The camera system can in this respect be installed at or in a street-lighting device, whereby it is achieved in an advantageous manner that no permission from private building owners has to be obtained. In addition, where required, the energy source of the street-lighting device can enable the energy supply of the camera system and of components connected thereto; alternatively, however, storage battery operation respectively battery operation is also possible.

The camera system can be installed and oriented such that it can preferably detect a respective plurality of parking bays of a parking space zone. The image indications of the parking bays delivered to the recognition unit can, for example, be image recordings of the complete parking bays or also only images of part areas of the parking bays. The image indications only have to represent a parking bay in such a manner that the recognition unit can associate an occupation status with the parking bays using the image indications that marks whether a respective parking bay is free or occupied. The occupation status of a parking bay determined by the recognition unit is then associated with its respective geographical coordinates that are stored in the recognition unit. These geographical coordinates are thereupon transmitted together with the associated occupation status to the transmission unit that then transmits these data to the display device and/or to the registration server and/or to the car park server that visually or acoustically illustrates the geographical locations at which free parking bays are located.

An internet-enabled mobile or stationary end device can preferably be used as the display unit that is in particular identical to the aforesaid mobile display unit. It is particularly preferred for the display unit to be configured as an internet-enabled cell phone ("smartphone") or as an internet-enabled vehicle computer. A stationary computer or a display panel can, however, also equally be used.

The transmission unit can deliver said data to a plurality of display units of different users to whom the location can respectively be displayed at which they can find free parking bays.

A plurality of, for example, public parking bays can consequently be detected together with their respective occupation status by means of the monitoring system, wherein it is possible on the basis of the detected data to communicate to a large number of users where free parking bars are actually located at a current point in time that can then be driven to directly and by the shortest route.

The recognition unit used can be completely located in the housing of the camera system; however, only parts of the recognition unit can also be accommodated in the housing of the camera system. In the last-named case, the remaining parts of the recognition unit are as a rule located in the region of the transmission unit, in particular within a server that also includes the transmission unit. The server can be identical to the registration server, whereby the monitoring system and the control device can access the same server. The transmission unit can, for example, be accommodated in a server space spatially spaced apart from the street-lighting device, wherein the server preferably has the occupation status information or image indications or data from a plurality of camera systems and/or recognition units provided wirelessly.

It is particularly preferred if a large portion of the evaluation of the image indications takes place within the recognition unit accommodated in the housing of the camera system since then only the data resulting from the evaluation have to be transmitted to the transmitter unit or to the server. The volume of these data is much lower than the data or image indications delivered by the camera system so that only a small bandwidth is required for the transmission of these data from the recognition unit to the server or to the transmitter unit. In addition, only evaluation data are then stored or processed on the server that are non-critical under aspects of data protection sine such evaluation data, unlike the image indications, do not include any vehicle license tags, for example.

If, for example, camera systems are installed at different street-lighting devices along a long street, it is not necessary for a separate recognition unit that respectively communicates with the transmission unit or with a server to be associated with each camera system. It is rather sensible in this case that only one or a few of the recognition units takes/take over said communication, whereas the other recognition units transmit their data using a narrow-band transmission system to the one or to a few recognition units that then communicate with the transmitter unit or with the server.

Alternatively, the evaluation of the image indications exclusively takes place within a housing of the camera system an in particular exclusively in the recognition unit. This means that no further data have to leave the housing of the camera system except for the occupation status that e.g. indicates the coordinates of free and occupied parking bays. For this purpose, the camera system and the recognition unit can be arranged in a common housing, wherein in particular the housing of the camera system forms the common housing. The images or the image indications recorded by the camera system can thus be processed within the housing and subsequently discarded. Strict data protection regulations that relate to public space can also be satisfied in this manner since no image data, personal information or the like are stored or output.

The image indications preferably exclusively comprise individual frames, i.e. still images. This means the evaluation in the recognition unit can only be based on individual frames. In this respect, the respective occupation status can be determined solely with reference to an individual frame. Alternatively or additionally, differences between two individual images of the same section of the parking space zone (i.e. differences between two image indications) can also be used for determining the occupation status.

Respective individual images of different areas of the parking space zone can in particular be detected after one another. On the use of a swivelable camera system, the camera system can be swiveled after the recording of an individual image and can detect a different area of the parking space zone. If a plurality of cameras are used, the cameras can each record an individual frame after one another and transmit it to the recognition unit.

The recognition unit is further preferably configured to determine an occupation status independently of predefined parking bays defined by lines on the ground, for example. This means that parking bays can also be recognized as free in a parking space zone when the parking bays are not marked as such by lines, rectangles or the like. The recognition of free parking bays can thus be carried out in the total field of vision of the camera system, independently of whether the parking bays are marked as such or not.

The recognition unit can furthermore be configured to determine the size of a respective parking bay recognized as free and output it together with the occupation status. A free parking bay can be assigned to a vehicle having suitable dimensions with reference to the size, whereby the number of vehicles that can be parked in a parking space zone can be increased.

In accordance with an advantageous embodiment, the camera system is adapted to set an exposure time in a substantially unlimited time range in dependence on the brightness in the field of vision of the camera system. It is made possible due to the exposure time adjustable over a wide time range also to generate image indications that can be evaluated in the dark without having to need additional lighting (e.g. infrared lighting). The exposure time can preferably be set with reference to the brightness in a part region in the field of vision. Two square part regions can, for example, be predefined in the field of vision within which the brightness is determined.

The possibility of using substantially any desired exposure times results from the recording of individual images for which the respective exposure time can be freely selected. An advantage hereby results with respect to video-based monitoring systems in which the maximum exposure time depends on the picture rate and cannot be set at any desired number.

The number of recorded image indications per unit of time can reduce due to the longer exposure time in the dark. However, the occupation state of parking bays does not change in very short time intervals so that very long exposure times of a plurality of seconds are also sufficient for a sufficiently exact monitoring of the parking bays. A maximum exposure time of one or two seconds can preferably be predefined.

The recognition unit can be configured to compensate movements of the camera system that are caused by movements of the street lighting device relative to the parking space zone in the image indications delivered by the camera system by means of an image processing method such that the image indications are not falsified by the movements of the camera system. Movements of the street-lighting system that are caused by wind, for example, can thus be compensated by an electronic image stabilization. For this purpose, reference points such as traffic lights, markings on houses or street signs can be fixed, at the image center where possible, that have an unchangeable position relative to the detected parking bays. A marking can preferably be attached to a carrier element ("lamp pole") of the street-lighting device, in particular in a region of the carrier element close to the ground. This has the advantage that the marking position can also be hardly changed e.g. by a strong wind and can typically be easily recorded by the camera system. This image indications of the parking bays can then be processed independently of their absolute positions within the image only in dependence on their position relative to the reference points or relative to the marking, whereby the named movements of the street-lighting devices can be eliminated in the processing.

In addition, an additional marking can be applied to the carrier element that is arranged spaced apart from the marking. A twisting of the carrier element can be determined, for example, on the basis of a displacement of the relative positions of the marking and the additional marking. Position changes of the camera system can hereby be determined even more precisely.

Alternatively or additionally, the recognition unit and/or the camera system can have at least one acceleration sensor and/or a gyroscope for detecting movements of the street-lighting device and of the camera system mounted at it. A rotation of the camera system can equally be detected by means of such components as movements along three orthogonal axes. The image indications of the camera system can in turn be processed on the basis of the measured data delivered by the acceleration sensor or the gyroscope such that they are not falsified by movements of the street-lighting device.

There are thus ultimately two different methods of compensating movements of the street-lighting device, wherein these two methods can be used alternatively or in combination. As a rule, the compensation by means of an image processing method is used when good and useful reference points are available. If this is not the case, the acceleration sensor or the gyroscope can be used.

It is particularly advantageous if the camera system has an electrically controllable swivel and tilt head for moving at least one camera optics relative to the parking space zone and/or has a zoom lens. The total parking space zone associated with a camera system can be detected with a high resolution by the movement of the swivel and tilt head and/or by setting the zoom lens. A periodic, exact coverage of the complete parking space zone becomes possible in this manner, wherein a series of positions of the swivel and tilt head with associated zoom settings can be fixed as part of an initializing process. These positions are then each moved to by a fast movement of the swivel and tilt head and by a zoom setting taking place in parallel, whereupon an image is recorded such that the next position can be moved to afterward. Previously recorded images or image indications can already be processed by the recognition during the adjustment of the swivel and tilt head between two positions.

The fact is particularly advantageous that, on the use of a swivel and tilt head, the initialization and thus the respective required alignment of the camera system can be carried out electronically and remotely by trained technicians after its installation at the street-lighting device since no adjustment at all is necessary during the installation itself.

Alternatively or additionally to the use of a swivel and tilt head, the camera system attached to the street-lighting device can also have a plurality of cameras stationary relative to one another and oriented differently from one another. These individual cameras then seamlessly and completely cover the parking space zone associated with the respective camera system, in particular without a movement of these cameras being necessary for this purpose.

It can be achieved both by the use of a camera system having a plurality of cameras and by the use of a swivel and tilt head with an adjustable zoom lens that distortion through wide-angle lenses can largely be avoided. It is in any case sensible to select a maximum angle of view of the camera for recording the image indications such that no image distortion occurs; alternatively, however, it is also possible to carry out a processor-assisted rectification on the occurrence of distortion.

In accordance with a preferred embodiment, the camera system comprises at least two fixed-position, differently oriented cameras whose fields of vision at least regionally overlap. The marking and/or the additional marking or the reference point for compensating movements of the camera system can preferably be arranged in the overlapping field of vision. The recognition unit advantageously respectively only evaluates the image indications of exactly one camera at one point in time or during a time interval. The respective camera or the other cameras can be switched off at the point in time or during the time interval. It is of advantage in this respect that the energy consumption of the monitoring system can be reduced. In addition, the possibility results of only providing exactly one processor (or microprocessor) in the recognition unit that is alternatingly coupled to one of the respective cameras. The material costs of the monitoring system can be reduced in this manner.

It is particularly advantageous if the camera system is fastened to a projection of the street-lighting device. As a rule, the illumination means of the street-lighting device are also arranged at such a projection such that it can be assumed with a high degree of probability that no objects such as trees are located between the projection and the zone to be illuminated or to be detected by the camera system. It is achieved by the fastening of the camera system to the projection to this extent that the field of view of the camera system is not restricted by disturbing objects with a high degree of probability.

This probability can be additionally increased when the camera system is arranged adjacent to a lighting module of the street-lighting device such that the spacing between the camera system and the carrier element, for example the lamp pole, is larger than the spacing between the lighting module and the carrier element. The camera system is then located as far as possibly away from the carrier element and thus also at a maximum distance from trees that may be present in the region of the carrier element.

The street-lighting device can furthermore be a lamp-carrying cable system that is, for example, installed between a plurality of buildings. A cable anchorage can be an element of the street-lighting device, wherein the camera system can be attached to the cable anchorage.

The recognition unit can be configured to control or to switch on or off or to dim the brightness of lighting modules of the street-lighting device in dependence on parameters determined from the image indications, in particular in dependence on brightness values and/or detected movements. This variant that is of interest under aspects of saving energy is based on the recognition that a comparatively bright lighting of the parking space zone is only necessary when it is dark and at the same time a movement of pedestrians or automobiles is detected. In other cases, a dimmed lighting is sufficient that must, however, be sufficient to be able to recognize the parking bays with sufficient resolution by means of the camera system. For example, in the event of snow on the parking space zone, the lighting can be dimmed, whereas with leaves on the parking space zone the lighting is increased. In addition, it becomes possible by the named variant to dim the lighting modules when the parking space zone is already illuminated by automobile headlamps.

It is particularly preferred if the recognition unit is configured to control the brightness of lighting modules of the street-lighting devices associated with it and of further street-lighting devices in dependence on parameters determined from the image indications, in particular in dependence on brightness values and/or detected movements. In this case, street-lighting device can then also be correspondingly switched on, switched off or dimmed that are present adjacent to the monitoring system and that have no monitoring system. In this manner, the installation of a monitoring system at every street-lighting device can be avoided; it is rather sufficient if the monitoring system is only present at some street-lighting devices that then likewise co-control the other street-lighting devices.

DRAWINGS

The invention will be described in the following purely by way of example with reference to the drawing. There is shown.

DETAILED DESCRIPTION

Figure 1:
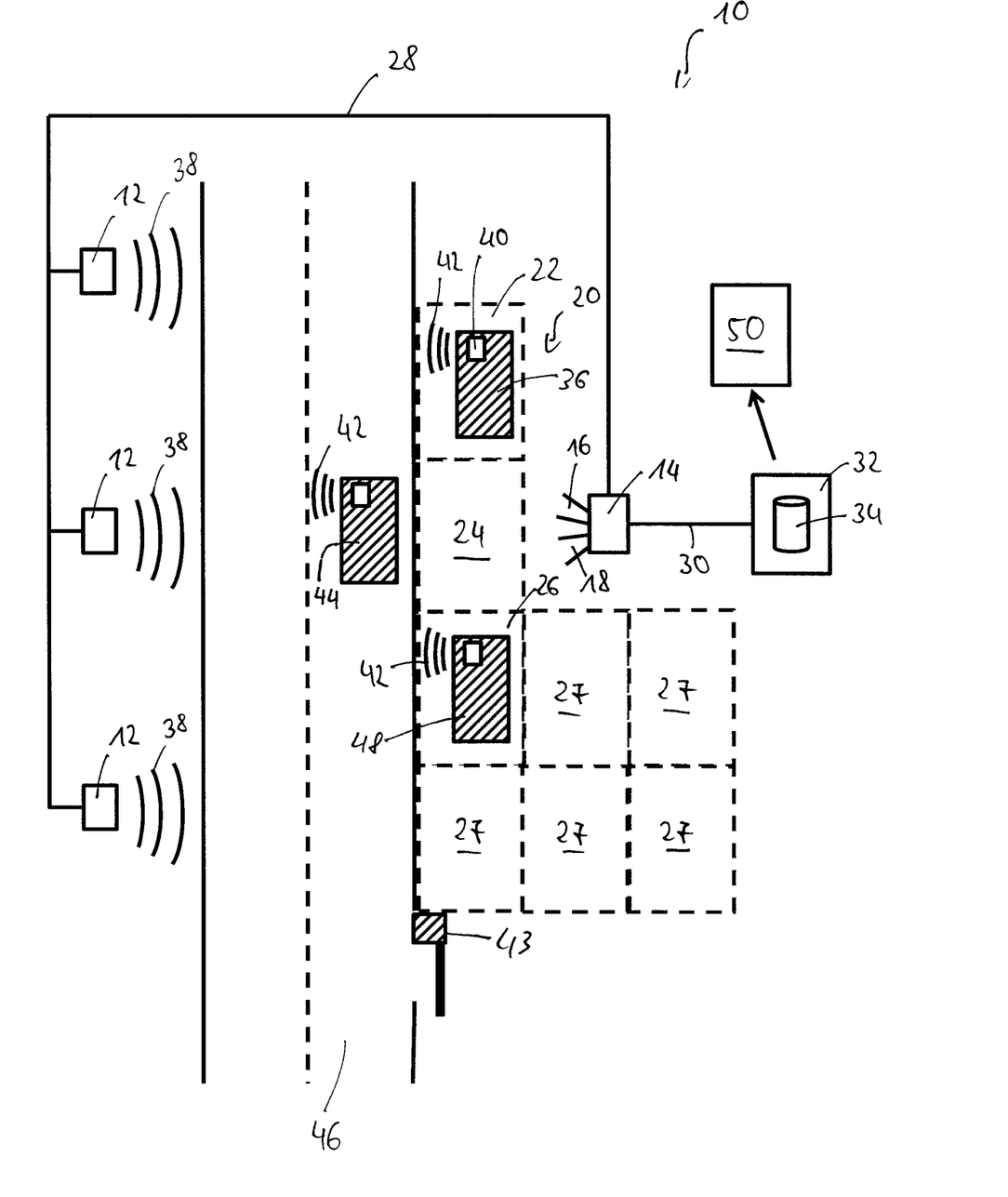
FIG. 1 shows a schematic view of a system for detecting parked vehicles.

FIG. 1 schematically shows a view of a system 10 for detecting parked vehicles. The system 10 comprises three radio deices 12 arranged spaced apart from one another and a monitoring system of which a camera unit 14 is shown. The camera unit 14 comprises a first camera 16 and a second camera 18 whose fields of view overlap at least regionally.

The camera unit 14 and the radio devices 12 monitor a parking space zone 20 on which a first parking bay 22, a second parking bay 24, and a third parking bay 26 are located. Five further parking bays 27 are moreover provided in the parking space zone 20.

The following explanation only relates by way of example to the three parking bays 22, 24, 26, with the system 10 being able to monitor longer streets or large areas having several hundred parking bays.

The first parking bay 22 and the second parking bay 24 are generally accessible parking bays. The third parking bay 26 in contrast is only released for persons having a disability. The further parking bays 27 can be reserved for drivers of electric cars.

The radio devices 12 are coupled to the camera unit 14 by means of a first data link 28, with a control device and a recognition unit (both not shown) being provided in the camera unit 14. The camera unit 14 is in turn coupled to a registration server 32 by means of a second data link 30. The registration server 32 comprises a database 34.

If a first vehicle 36 approaches the parking space zone 20 in operation of the system 10, query signals 38 that are responded to by a recognition signal 43 from a transponder 40 in the first vehicle 36 are repeatedly transmitted by the radio devices 12. The position of the transponder 40 is concluded by means of triangulation with reference to the time of flight up to the reception of the recognition signal 42.

The entrance to the parking space zone 20 is restricted by a barrier system 43. If it is recognized with reference to the transponder 40 that the first vehicle 36 is in the proximity of the barrier system 43, the barrier system 43 is opened to allow entry to the parking space zone 43. The barrier system 43 is opened here since the first vehicle 36 has a transponder 40. If no transponder 40 is present in a vehicle, a transponder 40 is issued to the driver of the vehicle by the barrier system 43.

As can be seen in FIG. 1, the first vehicle 36 stands in the first parking bay 22 after entering through the barrier system 43. The position of the first vehicle 36 is repeated, for example every second, by a repeat transmission of the query signal 38 and by the repeat reception of the recognition signal 42 so that is can be determined that the first vehicle 36 is permanently in the first parking bay 22.

At the same time, it is determined by the camera unit 14 that the first vehicle 36 (or at least some vehicle) is located in the first parking bay 22, whereby the localization of the first vehicle 36 is confirmed by means of the radio devices 12.

If it is recognized that the first vehicle 36 remains in the first parking bay 22 for longer than two minutes, an identification of the transponder 40 or of the vehicle 36 is transmitted to the registration server 32 via the second data line 30. The registration server 32 makes a check in its database 34 as to which vehicle owner the first vehicle 36 is associated with and whether the vehicle owner has an authorization to park in the first parking bay 22. If the vehicle owner has a corresponding authorization, this is communicated to the transponder 40 via a radio signal. The transponder 40 subsequently indicates the authorization by means of a green signal lamp.

Once it has later been communicated to the registration server 32 that the first vehicle 36 has departed the first parking bay 22 again, the parking charge for the first vehicle 36 is determined with reference to the parking duration and is debited to the vehicle owner.

A second vehicle 44 is double parked on a street 46. The second vehicle 44 is localized in the manner described above with reference to its transponder 40, with it being determined that the second vehicle 44 is parked on the street 46. An indication signal is thereupon output by the control device in the camera unit 14 that informs parking attendants or the police of the parking on the street 46.

A third vehicle 48 is likewise registered as parked, with the third vehicle 48 parking in the third parking bay 26 reserved for persons with a disability. A check is then made for the third vehicle 48 in the registration server 32 whether the third vehicle 48 is recorded in the database as a vehicle for a person with a disability and thus has a corresponding authorization. If this is not the case, a corresponding message can be sent to parking attendants by the registration server 32.

The registration server 32 communicates with a car park server 50. A status signal is transmitted from the registration server 32 to the car park server 50 that indicates which parking bays 22, 24, 26, 27 are occupied and whether the parking bays 22, 24, 26, 27 are respectively used by vehicles 36, 44, 48 that have a matching authorization. The car park server 50 provides a website (not shown) on which free and occupied parking bays 22, 24, 26, 27 are shown.

It is understood that the transponders 40 of the different vehicles 36, 44, 48 admittedly transmit recognition signals 42 of the same kind, but the recognition signals 42 include different information, with a different identification number being able to be transmitted e.g. for each vehicle 36, 44, 48.

REFERENCE NUMERAL LIST 10 system
12 radio device
14 camera unit
16 first camera
18 second camera
20 parking space zone
22 first parking bay
24 second parking bay
26 third parking bay
27 further parking bay
28 first data link
30 second data link
32 registration server
34 database
36 first vehicle
38 query signal
40 transponder
42 recognition signal
43 barrier system
44 second vehicle
46 street
48 third vehicle
50 car park server

The invention claimed is:

1. A method of detecting parked vehicles, wherein:
parking bays are recognized and/or determined in a parking space zone;
a transponder is arranged in or at a vehicle;
the transponder automatically repeatedly transmits a recognition signal;
the recognition signal is received by at least one radio device;
a position of the vehicle is calculated and an identification of the transponder is determined by means of a control device with reference to the recognition signal;
a determination is made whether the vehicle is located in one of the parking bays;
a determination is made with reference to the recognition signal whether the vehicle is parked;
if the vehicle is parked in one of the parking bays, the identification of the transponder and the parking bay used by the vehicle is transmitted to a registration server;
the registration server includes a database and checks the database for the identification of the transponder to determine an authorization status of the vehicle for the parking bay, with the authorization status being included in the status signal; and
the registration server outputs a status signal for the parking bay used with reference to the identification of the transponder.

2. The method in accordance with claim 1, wherein status signals relating to a plurality of parking bays are transmitted to at least one of a car park server and a mobile display device, with at least one of the car park server and the mobile display device displaying an overview of free and occupied parking bays with reference to the status signals.

3. The method in accordance with claim 1, wherein a transponder is issued to vehicles without transponders at an entrance to the parking space zone.

4. The method in accordance with claim 1, wherein an entrance restriction of the parking space zone is only removed when it has been recognized that the vehicle has a transponder and has an authorization to park in at least one parking bay of the parking space zone.

5. The method in accordance with claim 1, wherein a parking charge is calculated for the respective used parking bay with reference to at least one of the identification of the transponder, the parking bay used, a rate, and a parking duration determined when the vehicle departs the parking bay.

6. The method in accordance with claim 1, wherein at least one of a vehicle owner and a vehicle registration is associated with the identification of the transponder by the registration server; and wherein the authorization status is determined with reference to personal data of the at least one of the vehicle owner and the vehicle registration.

7. The method in accordance with claim 1, wherein the authorization status is also determined with reference to the day of the week.

8. The method in accordance with claim 1, wherein the transponder transmits the recognition signal in encrypted form.

9. The method in accordance with claim 8, wherein the recognition signal is generated by means of an asymmetrical encryption method.

10. The method in accordance with claim 1, wherein the transponder is configured to recognize a movement of the vehicle, with a frequency of occurrence of the transmission of recognition signals being reduced after a predefined time period without a movement of the vehicle.

11. The method in accordance with claim 1, wherein the transponder displays a status, with the status displaying whether an authorization to park in the respective parking bay is present.

12. The method in accordance with claim 1, wherein a warning signal is output if a vehicle has parked outside the parking bays.

13. The method in accordance with claim 1, wherein the parking space zone is detected at least regionally by means of a monitoring system, with free and occupied parking bays being recognized by means of a recognition unit.

14. The method in accordance with claim 13, wherein the radio devices and the monitoring system determine whether the vehicle is parked in the parking bay, with the identification of the transponder and the parking bay used by the vehicle being transmitted to the registration server only in response to the monitoring device and the radio devices determining that the vehicle is parked in the parking bay.

15. The method in accordance with claim 13, wherein a message signal is output if a vehicle is detected in a parking bay by the monitoring system, with the position or presence of the vehicle not having been determined by means of a recognition signal.

16. A system comprising:
   at least one transponder;
   at least one radio device;
   a control device; and
   a registration server that is connected to the control device by means of a data link and including a database,
   wherein the system is configured to carry out a method of detecting parked vehicles, in which method:
   parking bays are recognized and/or determined in a parking space zone;
   said at least one transponder is arranged in or at a vehicle;
   the at least one transponder automatically repeatedly transmits a recognition signal;
   the recognition signal is received by said at least one radio device;
   a position of the vehicle is calculated and an identification of the transponder is determined by means of said control device with reference to the recognition signal;
   a determination is made whether the vehicle is located in one of the parking bays;
   a determination is made with reference to the recognition signal whether the vehicle is parked;
   if the vehicle is parked in one of the parking bays,
   the identification of the transponder and the parking bay used by the vehicle is transmitted to the registration server;
   the registration server checks the database for the identification of the transponder to determine an authorization status of the vehicle for the parking bay, with the authorization status being included in a status signal; and
   the registration server outputs the status signal for the parking bay used with reference to the identification of the transponder.

17. The system in accordance with claim 16, wherein the at least one radio device is attached to a building front.

18. The system in accordance with claim 16, further comprising a monitoring system for the optical, at least regional, detection of the parking space zone, with the monitoring system comprising a camera system and a recognition unit that is configured to recognize free and occupied parking bays.

19. The system in accordance with claim 18, wherein the recognition unit comprises the control device.

* * * * *